June 12, 1956   J. J. RYAN   2,750,552
CONSTANT SPEED DRIVE
Filed July 31, 1953
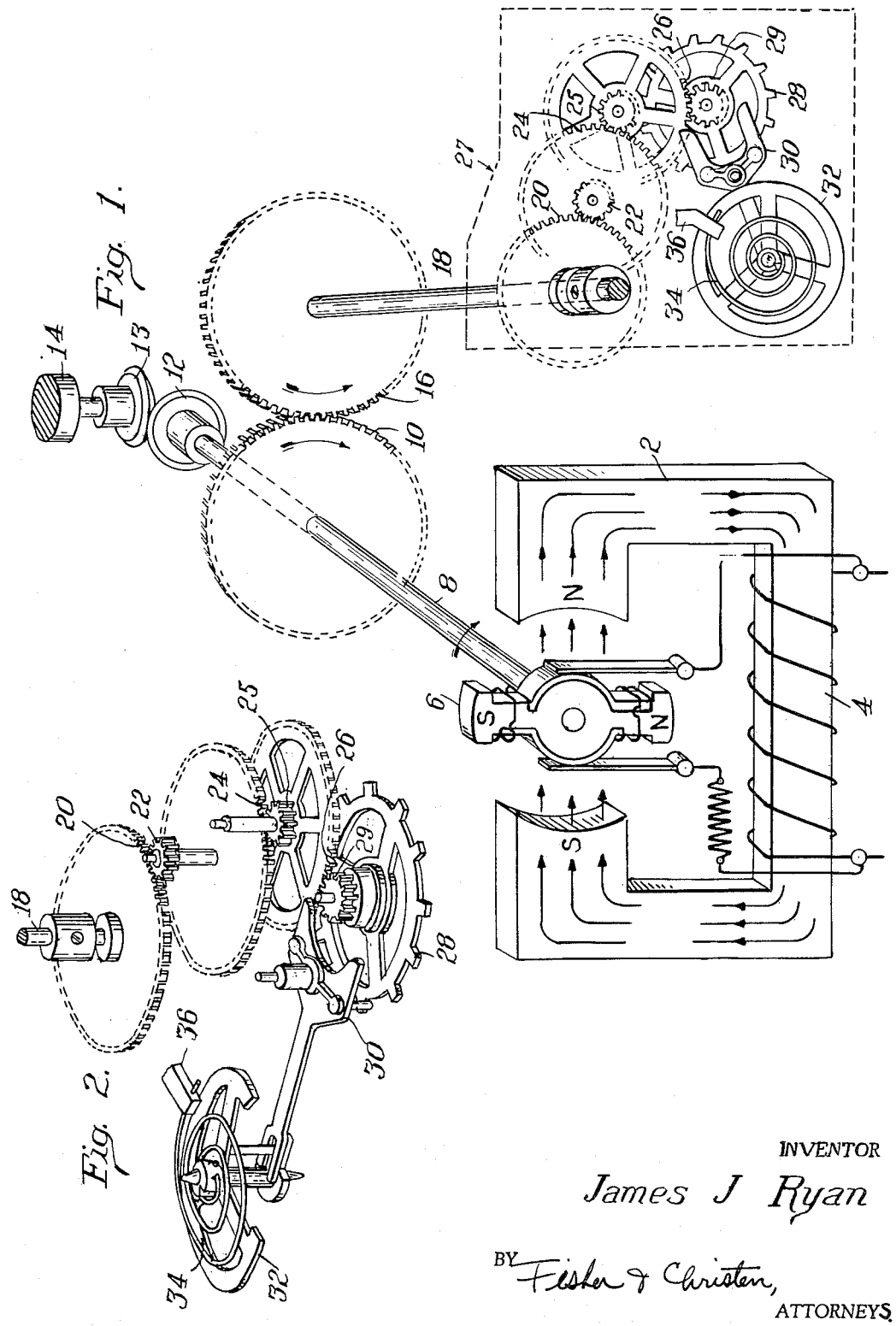
INVENTOR
James J Ryan
BY Fisher & Christen,
ATTORNEYS United States Patent Office 2,750,552
Patented June 12, 1956

2,750,552
CONSTANT SPEED DRIVE
James J. Ryan, St. Paul, Minn.
Application July 31, 1953, Serial No. 371,675
5 Claims. (Cl. 318—302)

This invention is a constant speed drive of general application, particularly a constant speed drive for instruments, such, for example, as a recorder wherein a stalled torque electric motor operates as a source of power, and is governed by a clock escapement mechanism to drive a shaft at a constant speed.

The principal object of the invention is to provide a constant speed drive, wherein the actuating torque is supplied directly by a stalled electric motor, no spring drive being used, so that there is no necessity for a spring drive and the attendant necessity of rewinding the spring, either by a motor or by the usual hand operated key.

Another object of the present invention is to provide a drive mechanism for use with instruments, such as a recorder or the like, wherein the driving speed will be constant regardless of normal changes in the driven load.

The ordinary electric motor when utilized to drive an instrument, such as a recorder, or the like, at slow speed, has a tendency to fluctuate in speed. These fluctuations are due to changes in input voltage and variations in instrument loading. According to this invention, a clock escapement mechanism is connected in parallel with the driven load, and when the stalled electric motor exerts its torque, the clock escapement mechanism will act as a governor and the output shaft will be driven at a constant speed, regardless of normal variation in power input to the motor or load changes on the instrument.

My invention contemplates placing the clock escapement mechanism outside of the actual torque drive, and in parallel thereto. In this manner the escapement mechanism will receive from the driving element, in general, only that portion of the torque which is in excess of the drive requirement of the driven element at the constant speed setting of the escapement mechanism. This arrangement allows the use of a clock escapement mechanism as an effective speed regulator.

Referring now to the annexed drawings, illustrating a recorder drive embodying the features of the present invention:

Figure 1 is a schematic perspective view of one embodiment of the invention;

Figure 2 is a schematic perspective view of the clock escapement mechanism shown generally in Figure 1.

Referring to these drawings, 2 denotes a known type of electric motor having a field coil 4 and armature 6. The motor 2 is a standard series or shunt motor, preferably a direct current motor, designed to develop a relatively constant output torque and having skewed armature laminations to permit a more uniform distribution of the armature flux, as is well known in the art.

The armature 6 is keyed to a motor shaft 8, which shaft 8 is keyed to gears 10 and 12. The gear 12 is connected in driving relationship with a shaft 14 through any suitable gear 13 to form a drive for a recorder or other like instrument. The shafts 8 and 14 are supported by suitable bearings.

Gear 10 meshes with and drives gear 16. Gear 16 is secured to a shaft 18, which drives gears 20, 22, 24, 25 and 26 of a conventional clock escapement mechanism generally indicated at 27.

Referring to Fig. 2, an escapement wheel 28 is driven by a pinion 29 and the gear 26 and is connected through a pallet 30 to a balance wheel 32. A balance spring 34 is connected at one extremity to the balance wheel 32 and at its other extremity to a stationary support 36.

From the connections described, shaft 14 and the clockwork shaft 18 are in parallel with relation to the motor shaft 8.

In the embodiment shown, the gear arrangement between the shaft 14 and the escapement mechanism 27 is such as to stall the motor, which exerts a torque on the escapement, which acts as a governor and allows the shaft 14 to be turned at a slow constant speed. This speed, for example, may be one revolution per hour, regardless of the torque input by the motor 2 or the torque loading on the shaft 14. Where the motor is used to drive a record strip of paper, foil, or the like, such strip is driven preferably at about 3½ to 5½ inches an hour. The motor 2, as noted, is operated under stall conditions and the torque output of the motor 2 is somewhat more than that normally required to drive the shaft 14 at the desired speed and the escapement mechanism 27 acts as a governor so that the speed of the driven element 14 is substantially constant.

In operation, direct current, preferably of low voltage, is supplied to the motor, which is stalled by its geared connections to shafts 14 and 18, the motor exerting torque on shaft 18 of the clock escapement. Shaft 14 is connected to any instrument to be driven at a substantially constant speed, such, for example, as the take-up spool of a flight recorder for airplanes, wherein a recording strip, conveniently of aluminum foil, is to be driven at a constant, and slow, speed. The aluminum foil used is a hard foil, about 0.001 inch thick, which will withstand temperatures of over 1,000° F. It is driven at about 3½ to 5½ inches an hour. The invention, however, is not limited to this particular use.

It is important that the voltage supplied to motor 2 is in excess of the power required to turn shaft 14 at the desired speed; therefore, even if the voltage should drop, there is still sufficient torque exerted by the stalled motor to drive shaft 14 at the desired speed.

The motor also drives in parallel, the clock escapement mechanism 27, the important function of which is to act as a governor on the motor drive; that is to say, the excess power of the motor which would tend to drive shaft 14 too fast, is absorbed by the clock escapement mechanism operating at greater amplitude without a change in speed, and so the speed of shaft 14 remains substantially constant. This is a well known principle of clock escapement mechanisms, since a usual clock runs at a substantially constant speed, although the driving spring may be tightly wound or nearly completely run down.

To summarize the action, if the load on shaft 14 increases, or the voltage decreases, each of which would tend to slow down shaft 14, the escapement 27 oscillates at lesser amplitude, thereby absorbing less torque, to keep the rate of shaft 14 substantially constant. And conversely, if the load on shaft 14 decreases, or the voltage increases, each of which would tend to speed up shaft 14, the escapement 27 oscillates at greater amplitude, thereby absorbing more torque to keep the rate of shaft 14 substantially constant.

Where, for example, the drive of the present invention is used to operate a flight recorder, a direct current motor, of the type which normally runs at about 5,000 R. P. M., at 28 volts will exert a stalled torque of about 6 inch-ounces, when operated, for example, at a reduced voltage of about 10 volts. The clock escapement will operate between 2 and 6 inch-ounces without changing speed. If the drive requires 3 inch-ounces, then 3 inch-ounces of torque remain to drive the clockwork. If the drive requires 2 inch-ounces, then the clockwise must absorb 4 inch-ounces as a governor. Instead of the clockwork escapement shown, other escapement mechanisms may be used in place thereof.

While the preferred embodiment of the invention has been described in some detail, it should be understood that the invention may be carried out in other ways, as falling within the scope of the claims.

I claim as my invention:

1. A constant speed drive for a recorder or the like, comprising a driven shaft connected to the recorder, a first gear carried by said shaft, a stalled motor for exerting a steady torque on said driven shaft and on said first gear, a second gear driven by said first gear, and a clock escapement mechanism, including a spring-controlled balance wheel, driven by said second gear for limiting the speed of rotation of said gears and thereby limiting the speed of rotation of said driven shaft.

2. A speed controlled driving system, comprising a stalled direct current electric motor having a shaft, a first gear affixed to said motor shaft, a second shaft, a second gear meshing with said first gear and fixed to said second shaft, a gear train connected to said second shaft, an escapement wheel driven by said gear train, a balance wheel connected to said escapement wheel, and a driven member driven by said motor shaft, whereby said escapement mechanism absorbs excess torque and allows said motor shaft to turn said driven member at a predetermined substantially constant speed.

3. A constant speed drive for a recorder or the like, comprising a stalled electric motor, a motor shaft, a first gear keyed to said motor shaft, a second shaft, a second gear meshing with said first gear and keyed to said second shaft, a clock escapement gear train including a spring controlled balance wheel driven by said second shaft, and a member to be driven operatively connected with said motor shaft, connected in parallel with respect to said second gear and escapement, whereby said escapement mechanism acts as a governor for absorbing excess torque for driving said driven member at a substantially constant speed.

4. A constant speed drive for a variable torque load, comprising a driven member for driving said variable load, a stalled, low voltage direct current motor operatively connected to said driven member for exerting a steady driving torque thereon, a clockwork escapement, including a spring-controlled balance wheel and gears operatively connecting said clockwork escapement in parallel with said motor, said escapement acting to stall the motor and to act as a governor thereon and to allow the motor and said variable load to move at a rate determined by the frequency oscillation of said balance wheel.

5. A constant speed drive for a variable torque load, comprising a driven member, a stalled, low voltage, direct current motor having a driven shaft connected to said driven member, a clock escapement mechanism including a spring-controlled balance wheel and gears directly connecting the motor shaft and the escapement mechanism, such gears and escapement mechanism serving to stall the motor and to act as a governor thereon to keep the rate of movement of the motor substantially constant under varying load on the driven shaft and varying voltages on the motor.

References Cited in the file of this patent

UNITED STATES PATENTS

| | | |
|---|---|---|
| 1,255,905 | Messiter | Feb. 12, 1918 |
| 1,659,028 | Holtz | Feb. 14, 1928 |